(12) United States Patent
Won et al.

(10) Patent No.: US 8,432,077 B2
(45) Date of Patent: Apr. 30, 2013

(54) BEARING HOLDER AND SPINDLE MOTOR HAVING THE SAME

(75) Inventors: Yong-Ho Won, Seoul (KR); Nak-Yun Sung, Suwon-si (KR); Jong-Min Yoon, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 212 days.

(21) Appl. No.: 12/926,845

(22) Filed: Dec. 13, 2010

(65) Prior Publication Data

US 2011/0163639 A1 Jul. 7, 2011

(30) Foreign Application Priority Data

Jan. 4, 2010 (KR) .................. 10-2010-0000112

(51) Int. Cl.
*H02K 11/00* (2006.01)
(52) U.S. Cl.
USPC .......................................... 310/67 R; 310/90
(58) Field of Classification Search ............... 310/67 R, 310/89–90, 425
See application file for complete search history.

(56) References Cited

U.S. PATENT DOCUMENTS

| | | | |
|---|---|---|---|
| 7,750,520 B2 * | 7/2010 | Smirnov et al. | 310/90 |
| 7,923,876 B2 * | 4/2011 | Smirnov et al. | 310/90 |
| 2007/0024137 A1 * | 2/2007 | Otsuki et al. | 310/90 |
| 2007/0290571 A1 * | 12/2007 | Yoon | 310/261 |
| 2010/0072844 A1 * | 3/2010 | Smirnov et al. | 310/90 |
| 2011/0169359 A1 * | 7/2011 | Min et al. | 310/90 |

FOREIGN PATENT DOCUMENTS

| | | |
|---|---|---|
| JP | 2001-314061 | 11/2001 |
| KR | 10-2009-0109757 | 10/2009 |

OTHER PUBLICATIONS

Korean Office Action issued Mar. 23, 2011 in corresponding Korean Patent Application 10-2010-0000112.
Chinese Office Action for Application No. 201010579382.X issued Sep. 5, 2012.

\* cited by examiner

*Primary Examiner* — Thanh Lam (57) ABSTRACT

A bearing holder and a spindle motor having the same are disclosed. The bearing holder in accordance with an embodiment of the present invention can include a body, which has an insertion hole formed therein such that a bearing is inserted into the insertion hole, a first supporting protrusion, which is protruded downward from a bottom surface of the body along a circumference of the insertion hole, and a first bent indentation, which is formed on an inner circumferential surface of the first supporting protrusion such that the first supporting protrusion is bent toward an inner side. Thus, unnecessary deformation in the bearing holder can be prevented while the bearing holder is coupled to a base plate. Moreover, since the bearing holder forms an accurate positional relationship with respect to the base plate, noise and vibration can be prevented from occurring during the operation of the motor.

12 Claims, 8 Drawing Sheets

BEARING HOLDER AND SPINDLE MOTOR HAVING THE SAME

CROSS-REFERENCE TO RELATED APPLICATIONS

This application claims the benefit of Korean Patent Application No. 10-2010-0000112, filed with the Korean Intellectual Property Office on Jan. 4, 2010, the disclosure of which is incorporated herein by reference in its entirety.

BACKGROUND

1. Technical Field

The present invention is related to a bearing holder and a spindle motor having the bearing holder.

2. Description of the Related Art

A motor converts electrical energy to mechanical energy, very typically through the interaction of magnetic fields and current-carrying conductors. The motor can include a shaft, which is the center of rotation, a bearing, which supports the shaft, a bearing holder, which supports the bearing, and a base plate, which supports the bearing holder. Accordingly, the bearing holder, which is interposed between the shaft and the base plate, determines the positional relationship between the shaft and the base plate.

However, when the bearing holder is coupled to the base plate, an external force applied to the bearing holder may deform the bearing holder. In this case, unnecessary deformation in the bearing holder may occur.

The unnecessary deformation remained in the bearing holder when the bearing holder is coupled to the base plate may affect the structure for supporting the shaft. This may cause vibrations and noise during the operation of the motor.

Accordingly, a new technology is needed to deform the bearing holder by applying a minimum external force only to the bearing holder while the bearing holder is coupled to the base plate.

SUMMARY

The present invention provides a bearing holder and a spindle motor having the bearing holder that can prevent unnecessary deformation in the bearing holder while the bearing holder is coupled to a base plate.

An aspect of the present invention provides a bearing holder. The bearing holder in accordance with an embodiment of the present invention can include a body, which has an insertion hole formed therein such that a bearing is inserted into the insertion hole, a first supporting protrusion, which is protruded downward from a bottom surface of the body along a circumference of the insertion hole, and a first bent indentation, which is formed on an inner circumferential surface of the first supporting protrusion such that the first supporting protrusion is bent toward an inner side.

The first bend indentation can have an annular shape that is extended along the inner circumferential surface of the first supporting protrusion. The first supporting protrusion can be extended along the circumference of the insertion hole.

The bearing holder can further include a first supporting surface formed between the insertion hole and the first supporting protrusion on the bottom surface of the body.

The bearing holder can further include a second supporting protrusion protruded downward from a perimeter of the bottom surface of the body. The bearing holder can further include a second supporting surface protruded to an outside of the second supporting protrusion.

The second supporting protrusion can be extended along the perimeter of the bottom surface of the body. The bearing holder can further include a second bent indentation formed on an outer circumferential surface of the second supporting protrusion such that the second supporting protrusion is bent toward an outer side.

Another aspect of the present invention provide a motor. The motor in accordance with an embodiment of the present invention can include a stator, a rotor, which rotates with respect to the stator, a shaft, which is coupled to the rotor, a bearing, which rotatably supports the shaft, a supporting plate, which supports a bottom side of the shaft, a bearing holder, which supports the bearing, and a base plate, which supports the bearing holder. Here, the bearing holder can include a body, which has an insertion hole formed therein such that the bearing is inserted into the insertion hole, and a first supporting protrusion, which is protruded downward from a bottom surface of the body along a circumference of the insertion hole and bent along a first bent indentation, which is formed on an inner circumferential surface of the first supporting protrusion, so as to support a bottom surface of the supporting plate.

The bearing holder can further include a first supporting surface formed between the insertion hole of the bottom surface of the body and the first supporting protrusion so as to support an upper surface of the supporting plate.

The bearing holder can further include a second supporting protrusion protruded downward from a perimeter of a bottom surface of the bearing holder and bent along a second bent indentation, which is formed on an outer circumferential surface of the second supporting protrusion, so as to support a bottom surface of the base plate.

The bearing holder can further include a second supporting surface protruded to an outside of the second supporting protrusion so as to support the bottom surface of the base plate.

Additional aspects and advantages of the present invention will be set forth in part in the description which follows, and in part will be obvious from the description, or may be learned by practice of the invention.

DETAILED DESCRIPTION

The features and advantages of this invention will become apparent through the below drawings and description.

A bearing holder in accordance with a certain embodiment of the present invention will be described below in more detail with reference to the accompanying drawings. Those components that are the same or are in correspondence are rendered the same reference numeral regardless of the figure number, and redundant descriptions are omitted.

Figure 1:
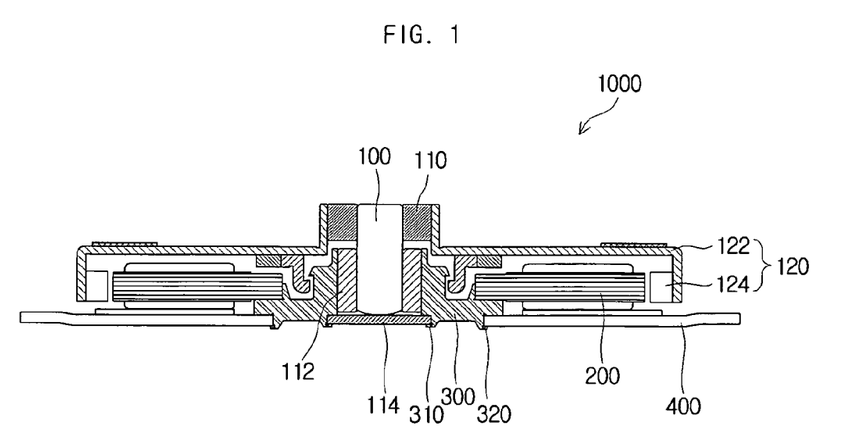
FIG. 1 is a cross-sectional view of a motor to which a bearing holder in accordance with an embodiment of the present invention is employed.

FIG. 1 is a cross-sectional view of a motor 1000 to which a bearing holder 300 in accordance with an embodiment of the present invention is employed. As illustrated in FIG. 1, the motor 1000 can include a rotor 120, a boss 110, a shaft 100, a bearing 112, the bearing holder 300, a stator 200, a base plate 400 and a supporting plate 114.

The stator 200, which generates a magnetic filed, can be mounted on the base plate 400, and an inner side of the stator 200 can be supported by an outer side of the bearing holder 300.

The rotor 120 can be coupled in such a way that the rotor 120 covers the stator 200 along the circumference of the stator 200. The rotor 120 can include a housing 122, which covers the stator 200, and a magnet 124, which is coupled to an inner circumferential surface of the rotor 120 so as to face an outer side of the stator 200.

The boss 110 can be coupled to the center of the rotor 120, and the shaft 100 can be coupled to the center of the boss 110. An upper part of the shaft 100 can be coupled to the boss 110, and a lower part of the shaft 100 can be rotatably supported by the bearing 112. A bottom side of the shaft 100 can be supported by the supporting plate 114.

An outer side of the bearing 112 can be supported by the bearing holder 300. An inner side of the bearing holder 300 can support the bearing 112, and an outer side of the bearing holder 300 can be coupled to the base plate 400. The supporting plate 114 supporting the bottom side of the shaft 100 can be coupled to a lower side of the bearing holder 300.

Accordingly, the bearing holder 300 functions not only as a holder to which the bearing 112, which supports an outer circumferential surface of the shaft 100, and the supporting plate 114, which supports the bottom side of the shaft 100, are coupled but also to fix the bearing 112 and the supporting plate 114 to the base plate 400. This shows that the bearing holder 300 is a component that determines the positional relationship between the shaft 100 and the base plate 400.

Figure 2:
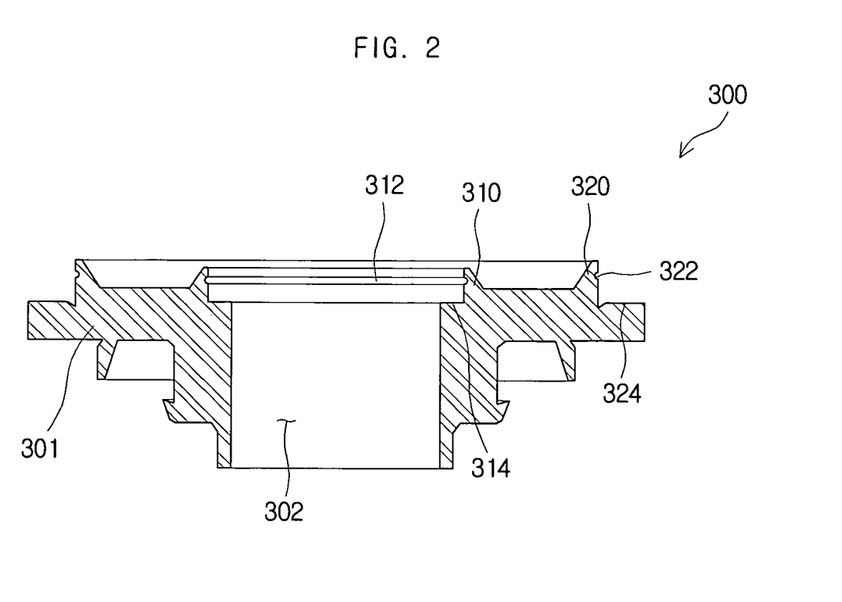
FIG. 2 is a cross-sectional view of a bearing holder in accordance with an embodiment of the present invention.

FIG. 2 is a cross-sectional view of the bearing holder 300 in accordance with an embodiment of the present invention. As illustrated in FIG. 2, the bearing holder 300 can include a body 301, a first supporting protrusion 310, a first bend indentation 312, a first supporting surface 314, a second supporting protrusion 320, a second bend indentation 322 and a second supporting surface 324.

The body 301 can be a main body of the bearing holder 300. An insertion hole 302 penetrating vertically through the body 301 can be formed in the center of the body 301. The bearing 112 can be inserted into the insertion hole 302, and an inner circumferential surface of the insertion hole 302 can support an outer circumferential surface of the bearing 112.

Figure 3:
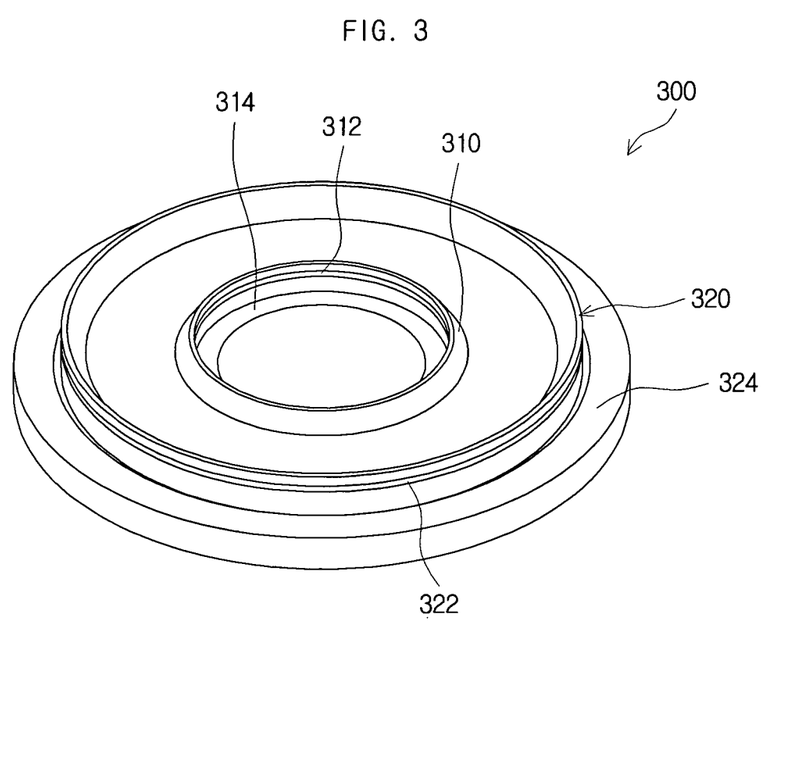
FIG. 3 is a perspective view illustrating a lower part of a bearing holder in accordance with an embodiment of the present invention.

FIG. 3 is a perspective view illustrating a lower part of the bearing holder 300 in accordance with an embodiment of the present invention. As illustrated in FIGS. 2 and 3, the first supporting protrusion 310 can be protruded downward from a bottom surface of the body 301 along the circumference of the insertion hole 302. Here, the first supporting protrusion 310 can be shaped like an annular wall that is formed on the bottom surface of the body 301 and extended along the circumference of the insertion hole 302.

Although an example of the first supporting protrusion 310 having a single ring-shaped wall is described in the present embodiment, it is also possible that the first supporting protrusion 310 can be provided as a plurality of protrusions that are formed on the bottom surface of the body 301 and protruded downward from the circumference of the insertion hole 302.

The first bend indentation 312 can be formed on an inner circumferential surface of the first supporting protrusion 310 such that the first supporting protrusion 310 can be easily bent toward an inner side. The first bend indentation 312 can have an annular shape that is extended along the inner circumferential surface of the first supporting protrusion 310.

Figure 4:
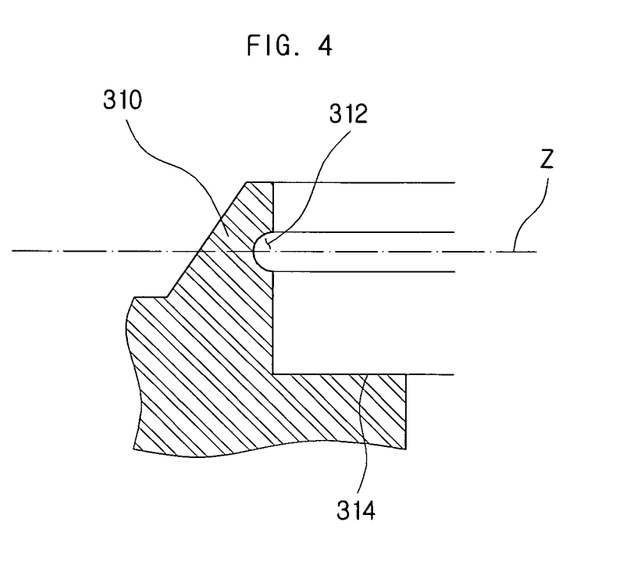
FIG. 4 is a cross-sectional view of a first supporting protrusion of a bearing holder in accordance with an embodiment of the present invention.

FIG. 4 is a cross-sectional view of the first supporting protrusion 310 of the bearing holder 300 in accordance with an embodiment of the present invention. As illustrated in FIG. 4, the first bend indentation 312 can be formed at a location (marked "Z" in FIG. 4) where the first supporting protrusion 310 is bent.

The first bend indentation 312 can reduce the cross-sectional area of the first supporting protrusion 310 at the location where the first supporting protrusion 310 is bent, thus minimizing an external force that is needed to bend the first supporting protrusion 310. Accordingly, while the first supporting protrusion 310 is bent inward to support the supporting plate 114, unnecessary deformation in the bearing holder 300 can be prevented.

Figure 5:
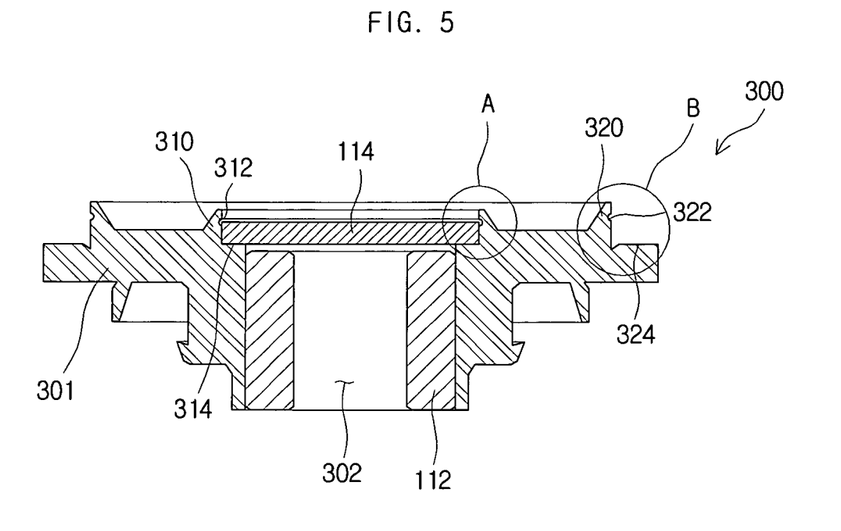
FIG. 5 is a cross-sectional view illustrating a process of manufacturing a motor to which a bearing holder in accordance with an embodiment of the present invention is employed.

FIG. 5 is a cross-sectional view illustrating a process of manufacturing the motor 1000 to which the bearing holder 300 in accordance with an embodiment of the present invention is employed. As illustrated in FIG. 5, in the process of manufacturing the motor 1000, the bearing 112 can be inserted into the insertion hole 302 of the bearing holder 300, and the supporting plate 114 can be seated on the first supporting surface 314.

The first supporting surface 314, which is formed annularly between the insertion hole 302 and the first supporting protrusion 310 on the bottom surface of the body 301, can support a surface of the supporting plate 114 that faces the bearing 112.

Figure 6:
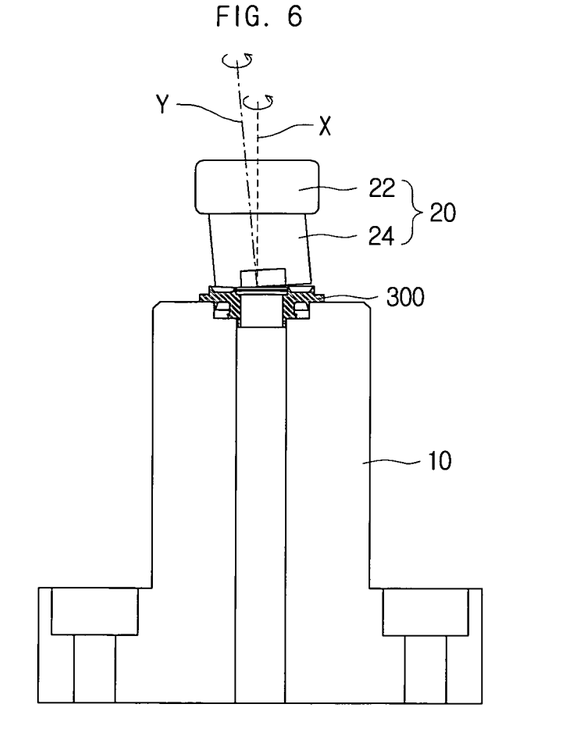
FIG. 6 is a diagram illustrating a process of bending a first supporting protrusion of a bearing holder in accordance with an embodiment of the present invention.

FIG. 6 is a diagram illustrating a process of bending the first supporting protrusion 310 of the bearing holder 300 in accordance with an embodiment of the present invention. As illustrated in FIG. 6, the bearing holder 300 of FIG. 5 can be seated on a jig 10, and the first supporting protrusion 310 can be bent by a pressing tool 20.

The pressing tool 20 can include a first rotating unit 22, which has a rotational axis (marked "X" in FIG. 6) that coincides with the center of the bearing holder 300, and a second rotating unit 24, which is coupled to a bottom side of the first rotating unit 22 and rotates about an axis (marked "Y" in FIG. 6) that is tilted from the rotational axis (marked "X" in FIG. 6) of the first rotating unit 22.

When the pressing tool 20 rotates, a bottom surface of the second rotating unit 24 can press an outer side of the first supporting protrusion 310, and when the pressing tool 20 makes one full rotation, the entire ring-shaped first supporting protrusion 310 can be bent inward.

Figure 7:
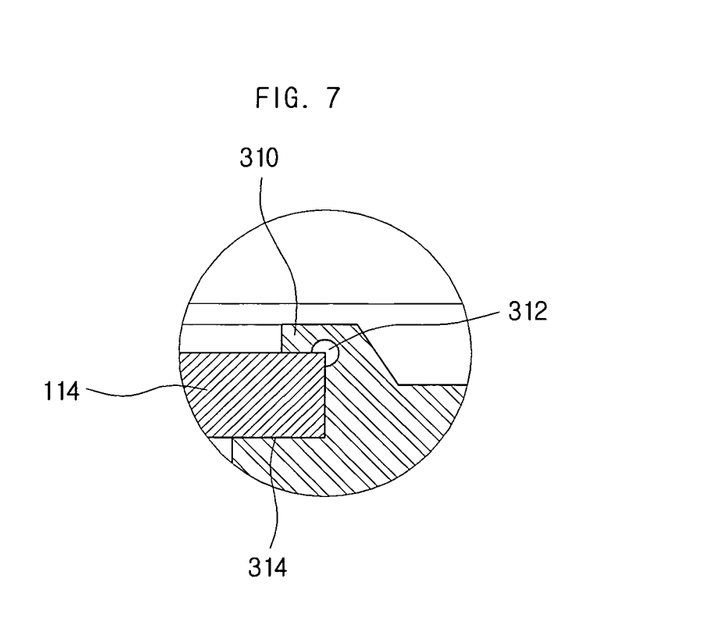
FIG. 7 is a magnified view of a section marked "A" in FIG. 5.

FIG. 7 is a magnified view of a section marked "A" in FIG. 5. As illustrated in FIG. 7, the first supporting protrusion 310 pressed by the pressing tool 20 can be bent inward about the first bend indentation 312. With this arrangement, the supporting plate 114 can be interposed between the first supporting protrusion 310 and the first supporting surface 314 and thus coupled to the bearing holder 300.

Here, as described above, the first bend indentation 312, which is formed at a part where the first supporting protrusion 310 is bent, can reduce an external force applied to the first supporting protrusion 310 to bend the first supporting protrusion 310 by reducing the cross-sectional area of the first supporting protrusion 310, and thus unnecessary deformation in the bearing holder 300 can be prevented.

This can also prevent the occurrence of inaccurate positional relationship between the base plate 400 and the bearing holder 300 that can be caused by the unnecessary deformation in the bearing holder 300, and thus there can be formed an accurate positional relationship between the shaft 100 and the base plate 400. Moreover, the occurrence of noise and vibration due to the inaccurate positional relationship of the shaft 100 can be prevented during the operation.

Meanwhile, as illustrated in FIGS. 2 to 5, the second supporting protrusion 320 can be protruded downward from a perimeter of the bottom surface of the body 301 of the bearing holder 300. The second supporting protrusion 320 can be shaped like an annular wall that is protruded downward and extended along the perimeter of the bottom surface of the body 301 of the bearing holder 300.

The second bend indentation 322 can be formed on an outer circumferential surface, which is a part where the second supporting protrusion 320 is bent, of the second supporting protrusion 320. Like the first bend indentation 312, the second bend indentation 322 can reduce a cross-sectional area of the second supporting protrusion 320 at the location where the second supporting protrusion 320 is bent, thus reducing an external force that is needed to deform the second supporting protrusion 320.

Accordingly, unnecessary deformation in the bearing holder 300 can be prevented while forming a structure of fixing the base plate 400 to the bearing holder 300. Moreover, since the bearing holder 300 forms an accurate positional relationship with respect to the base plate 400, the shaft 100, which is supported by the bearing holder 300, can form an accurate positional relationship with respect to the base plate 400.

The second supporting surface 324 can be protruded to the outside of the second supporting protrusion 320, which is formed on the bottom surface of the body 301 of the bearing holder 300. The second supporting surface 324 provides a surface on which the bearing holder 300 is supported by the base plate 400, and thus the bearing holder 300 can be stably supported by the base plate 400.

Figure 8:
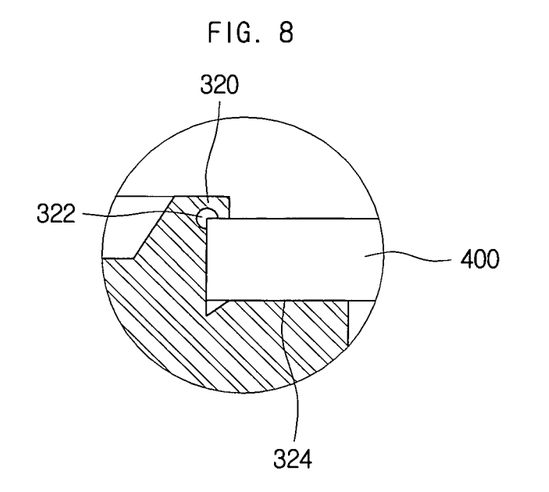
FIG. 8 is a magnified view of section marked "B" in FIG. 5.

FIG. 8 is a magnified view of a section marked "B" in FIG. 5. Illustrated in FIG. 8 is the base plate 400, which is seated on the second supporting surface 324 of the bearing holder 300 shown in FIG. 5. As illustrated in FIG. 8, the second supporting protrusion 320 can be inserted into a portion of the base plate 400 into which the bearing holder 300 is inserted and then bent toward the outside of the bearing holder 300. Accordingly, the second supporting protrusion 320 can function to fix the bearing holder 300 to the base plate 400.

With this arrangement, the base plate 400 can be interposed between the second supporting surface 324 and the second supporting protrusion 320 and thus coupled to the bearing holder 300.

According to an embodiment of the present invention, unnecessary deformation in a bearing holder can be prevented while the bearing holder is coupled to a base plate. Moreover, since the bearing holder forms an accurate positional relationship with respect to the base plate, noise and vibration can be prevented from occurring during the operation of the motor.

While the spirit of the invention has been described in detail with reference to a certain embodiment, the embodiment is for illustrative purposes only and shall not limit the invention. It is to be appreciated that those skilled in the art can change or modify the embodiment without departing from the scope and spirit of the invention.

What is claimed is:

1. A bearing holder comprising:
   a body having an insertion hole formed therein such that a bearing is inserted into the insertion hole;
   a first supporting protrusion protruded downward from a bottom surface of the body along a circumference of the insertion hole; and
   a first bent indentation formed on an inner circumferential surface of the first supporting protrusion such that the first supporting protrusion is bent toward an inner side.

2. The bearing holder of claim 1, wherein the first bend indentation has an annular shape that is extended along the inner circumferential surface of the first supporting protrusion.

3. The bearing holder of claim 1, wherein the first supporting protrusion is extended along the circumference of the insertion hole.

4. The bearing holder of claim 1, further comprising a first supporting surface formed between the insertion hole and the first supporting protrusion on the bottom surface of the body.

5. The bearing holder of claim 1, further comprising a second supporting protrusion protruded downward from a perimeter of the bottom surface of the body.

6. The bearing holder of claim 5, further comprising a second supporting surface protruded to an outside of the second supporting protrusion.

7. The bearing holder of claim 5, wherein the second supporting protrusion is extended along the perimeter of the bottom surface of the body.

8. The bearing holder of claim 7, further comprising a second bent indentation formed on an outer circumferential surface of the second supporting protrusion such that the second supporting protrusion is bent toward an outer side.

9. A motor comprising:
   a stator;
   a rotor configured to rotate with respect to the stator;
   a shaft coupled to the rotor;
   a bearing rotatably supporting the shaft;
   a supporting plate supporting a bottom side of the shaft;
   a bearing holder supporting the bearing; and
   a base plate supporting the bearing holder,
   wherein the bearing holder comprises:
   a body having an insertion hole formed therein such that the bearing is inserted into the insertion hole; and
   a first supporting protrusion protruded downward from a bottom surface of the body along a circumference of the insertion hole and bent along a first bent indentation, which is formed on an inner circumferential surface of the first supporting protrusion, so as to support a bottom surface of the supporting plate.

10. The motor of claim 9, wherein the bearing holder further comprises a first supporting surface formed between the insertion hole of the bottom surface of the body and the first supporting protrusion so as to support an upper surface of the supporting plate.

11. The motor of claim 9, wherein the bearing holder further comprises a second supporting protrusion protruded downward from a perimeter of a bottom surface of the bearing holder and bent along a second bent indentation, which is formed on an outer circumferential surface of the second supporting protrusion, so as to support a bottom surface of the base plate.

12. The motor of claim 11, wherein the bearing holder further comprises a second supporting surface protruded to an outside of the second supporting protrusion so as to support the bottom surface of the base plate.

* * * * *